(12) United States Patent
Clarke et al.

(10) Patent No.: US 9,034,408 B2
(45) Date of Patent: May 19, 2015

(54) PACKAGING

(75) Inventors: Raymond Clarke, Los Altos, CA (US); Nicholas J. Tompkins, Arroyo Grande, CA (US)

(73) Assignee: Apio, Inc., Guadalupe, CA (US)

( * ) Notice: Subject to any disclaimer, the term of this patent is extended or adjusted under 35 U.S.C. 154(b) by 2618 days.

(21) Appl. No.: 10/597,515

(22) PCT Filed: Dec. 13, 2004

(86) PCT No.: PCT/US2004/042018
§ 371 (c)(1),
(2), (4) Date: Jul. 27, 2006

(87) PCT Pub. No.: WO2005/074466
PCT Pub. Date: Aug. 18, 2005

(65) Prior Publication Data
US 2007/0259082 A1    Nov. 8, 2007

Related U.S. Application Data

(60) Provisional application No. 60/540,121, filed on Jan. 28, 2004, provisional application No. 60/539,949, filed on Jan. 28, 2004.

(51) Int. Cl.
*A23B 7/148* (2006.01)
*B65B 25/04* (2006.01)
(Continued)

(52) U.S. Cl.
CPC .............. *A23B 7/148* (2013.01); *B65B 25/041* (2013.01); *B65D 81/2076* (2013.01); *B65D 88/745* (2013.01); *B65D 2588/746* (2013.01)

(58) Field of Classification Search
CPC .. A23B 7/148; B65D 88/745; B65D 81/2076; B65D 2588/746; B65B 25/041

USPC .......... 426/118, 106, 124, 418, 419, 415, 395, 426/316, 232; 99/467, 473, 474, 475
See application file for complete search history.

(56) References Cited

U.S. PATENT DOCUMENTS 3,360,380 A    12/1967    Karakian
3,369,343 A    2/1968    Robb
(Continued)

FOREIGN PATENT DOCUMENTS

CN    1137349 A    12/1996
CN    1238445 A    12/1999
(Continued)

OTHER PUBLICATIONS

Marcellin, P. "Storage of Fruits and Vegetables in Controlled Atmospher Using Polymer Membranes", Revue Generale du Froid Num. Mar. 3, 1974, pp. 217-236.

*Primary Examiner* — Viren Thakur
(74) *Attorney, Agent, or Firm* — T. Richardson; J. McDonald (57) ABSTRACT

Atmosphere control members (ACMs) are used in various ways. In one aspect, at least one of the atmospheres in contact with the ACM is cause to flow over the surface of the ACM. In another aspect, the ACM is an internal ACM which does not form part of the exterior surface of a container. In another aspect, the ACM forms part of a reusable module. In another aspect, a plurality of sealed containers, each including an ACM, are stored in an outer container also including an ACM. FIGS. 3-5 illustrate a shipping container (11) comprising an internal ACM (3) having one surface which is exposed to the packaging atmosphere within the shipping container and an opposite surface which is part of a closed chamber (2) to which gases can be supplied in a controlled fashion.

18 Claims, 3 Drawing Sheets

(51) Int. Cl.
  *B65D 81/20* (2006.01)
  *B65D 88/74* (2006.01)

(56) References Cited

U.S. PATENT DOCUMENTS

| | | | |
|---|---|---|---|
| 3,450,542 A | 6/1969 | Badran | |
| 3,450,544 A | 6/1969 | Wilson et al. | |
| 3,630,759 A * | 12/1971 | Rumberger | 426/124 |
| 3,798,333 A | 3/1974 | Cummin et al. | |
| 3,924,010 A | 12/1975 | Erb et al. | |
| RE28,995 E * | 10/1976 | Burg | 426/419 |
| 4,003,728 A | 1/1977 | Rath | |
| 4,685,939 A | 8/1987 | Kratz | |
| 4,734,324 A | 3/1988 | Hill | |
| 4,779,524 A | 10/1988 | Wade | |
| 4,830,863 A | 5/1989 | Jones | |
| 4,842,875 A * | 6/1989 | Anderson | 426/118 |
| 4,863,492 A | 9/1989 | Doshi et al. | |
| 4,867,766 A | 9/1989 | Campbell et al. | |
| 4,879,078 A | 11/1989 | Antoon | |
| 4,896,514 A | 1/1990 | Sugiyama | |
| 4,910,032 A * | 3/1990 | Antoon, Jr. | 426/118 |
| 4,923,703 A | 5/1990 | Antoon | |
| 4,949,847 A * | 8/1990 | Nagata | 206/484.1 |
| 4,963,165 A | 10/1990 | Blume | |
| 4,987,745 A | 1/1991 | Harris | |
| 5,041,290 A | 8/1991 | Gindrat | |
| 5,045,331 A | 9/1991 | Antoon | |
| 5,082,471 A | 1/1992 | Athayde et al. | |
| 5,120,329 A | 6/1992 | Sauer et al. | |
| 5,158,584 A | 10/1992 | Tamura | |
| 5,160,768 A * | 11/1992 | Antoon, Jr. | 428/35.2 |
| 5,183,571 A | 2/1993 | Hanel et al. | |
| 5,254,354 A | 10/1993 | Stewart | |
| 5,333,394 A | 8/1994 | Herdeman et al. | |
| 5,342,637 A | 8/1994 | Kusters | |
| 5,355,781 A | 10/1994 | Liston et al. | |
| 5,433,335 A | 7/1995 | Raudalus et al. | |
| 5,437,837 A | 8/1995 | Olson et al. | |
| 5,460,841 A | 10/1995 | Herdeman | |
| 5,623,105 A | 4/1997 | Liston et al. | |
| 5,658,607 A | 8/1997 | Herdeman | |
| 5,676,736 A | 10/1997 | Crozel | |
| 5,791,150 A | 8/1998 | Bosher et al. | |
| 5,791,236 A * | 8/1998 | Schouten | 99/468 |
| 5,801,317 A * | 9/1998 | Liston et al. | 73/863.81 |
| 5,807,630 A | 9/1998 | Christie et al. | |
| 5,832,699 A | 11/1998 | Zobel | |
| 5,872,721 A | 2/1999 | Huston et al. | |
| 5,876,486 A | 3/1999 | Steinwandel et al. | |
| 5,890,366 A | 4/1999 | Yang | |
| 5,900,129 A | 5/1999 | Tsuji et al. | |
| 5,960,708 A | 10/1999 | DeTemple et al. | |
| 6,007,603 A * | 12/1999 | Garrett | 95/12 |
| 6,013,293 A * | 1/2000 | De Moor | 426/106 |
| 6,092,430 A | 7/2000 | Liston et al. | |
| 6,093,238 A | 7/2000 | Huf | |
| 6,190,436 B1 | 2/2001 | Ji et al. | |
| 6,190,710 B1 | 2/2001 | Nir et al. | |
| 6,210,724 B1 | 4/2001 | Clarke et al. | |
| 6,296,923 B1 | 10/2001 | Zobel | |
| 6,376,032 B1 * | 4/2002 | Clarke et al. | 428/34.7 |
| 6,410,465 B1 | 6/2002 | Lim | |
| 6,427,484 B1 | 8/2002 | Choi et al. | |
| 6,456,943 B1 | 9/2002 | Kogure | |
| 6,468,328 B2 | 10/2002 | Sircar | |
| 6,548,132 B1 | 4/2003 | Clarke | |
| 6,579,607 B1 | 6/2003 | Gozukara | |
| 6,582,498 B1 | 6/2003 | Sass et al. | |
| 6,615,908 B1 | 9/2003 | Bosher | |
| 6,709,483 B1 | 3/2004 | Hodgson, Jr. | |
| 6,840,982 B2 | 1/2005 | Kunstadt | |
| 7,329,452 B2 | 2/2008 | Clarke | |
| 7,396,383 B2 | 7/2008 | Burban et al. | |
| 7,601,202 B2 | 10/2009 | Noack et al. | |
| 7,601,374 B2 | 10/2009 | Clarke | |
| 7,866,258 B2 * | 1/2011 | Jorgensen et al. | 99/468 |
| 2002/0090425 A1 | 7/2002 | Clarke | |
| 2002/0127305 A1 * | 9/2002 | Clarke | 426/106 |
| 2003/0057217 A1 | 3/2003 | Wyslotsky | |
| 2003/0061938 A1 | 4/2003 | Kunstadt | |
| 2003/0154857 A1 | 8/2003 | Murdoch | |
| 2004/0131810 A1 | 7/2004 | Clarke | |
| 2005/0284814 A1 | 12/2005 | Mairal | |
| 2006/0162577 A1 | 7/2006 | Jorgensen | |
| 2007/0065546 A1 | 3/2007 | Jorgensen | |
| 2008/0173179 A1 | 7/2008 | Tandon | |
| 2008/0202262 A1 | 8/2008 | Schmidt | |

FOREIGN PATENT DOCUMENTS

| | | |
|---|---|---|
| DE | 3842930 A1 | 6/1990 |
| DE | 19518407 A1 | 11/1996 |
| DE | 19545764 A1 | 6/1997 |
| DE | 19849216 A1 | 4/2000 |
| DE | 19951732 A1 | 5/2001 |
| DE | 10051910 A1 | 5/2002 |
| DE | 10233182 A1 | 7/2003 |
| EP | 0351115 A2 | 1/1990 |
| EP | 0351116 A2 | 1/1990 |
| EP | 0551158 A1 | 7/1993 |
| EP | 0611037 A1 | 8/1994 |
| EP | 0767139 B1 | 4/1997 |
| EP | 0888804 A2 | 1/1999 |
| EP | 0997164 A2 | 5/2000 |
| JP | 55124449 A | 9/1980 |
| JP | 60118605 A | 6/1985 |
| JP | 63062537 A | 3/1988 |
| JP | 63062537 B | 12/1988 |
| JP | 01264905 A | 10/1989 |
| JP | H1-273515 | 11/1989 |
| JP | 2221102 A | 9/1990 |
| JP | 3061198 A | 3/1991 |
| JP | 6234505 A | 8/1994 |
| JP | 9206046 A | 8/1997 |
| WO | WO 9412040 A1 | 6/1994 |
| WO | WO 9522729 A1 | 8/1995 |
| WO | WO 9638495 A1 | 12/1996 |
| WO | WO 0004787 A1 | 2/2000 |
| WO | WO 0192118 A2 | 12/2001 |
| WO | WO 03043447 A1 | 5/2003 |
| WO | WO 2004107868 A1 | 12/2004 |

* cited by examiner

PACKAGING

CROSS-REFERENCE TO RELATED APPLICATION

This application is a national stage filing under 35 USC 371 of PCT/US04/042018 filed Dec. 13, 2004, which claims the benefit under 35 USC 120 of U.S. Provisional Application No. 60/540,121, filed Jan. 28, 2004, and U.S. Provisional Application No. 60/539,949, filed Jan. 28, 2004. The entire disclosure of each of those applications is incorporated by reference herein for all purposes.

BACKGROUND OF THE INVENTION

This invention relates to the packaging of respiring biological materials, and other situations in which control of the gases in an atmosphere is desirable.

Respiring biological materials, e.g. fruits and vegetables, consume oxygen ($O_2$) and produce carbon dioxide ($CO_2$) at rates which depend upon the stage of their development, the atmosphere surrounding them and the temperature. In modified atmosphere packaging (MAP), the objective is to produce a desired packaging atmosphere around respiring materials by placing them in a sealed container whose permeability to $O_2$ and $CO_2$ produces the desired packaging atmosphere. Often, the container includes at least one atmosphere control member having a high $O_2$ transmission rate (OTR) and a high $CO_2$ transmission rate (COTR). In controlled atmosphere packaging (CAP), the objective is to produce a desired packaging atmosphere by displacing some or all of the air within a sealed container by one or more gases, e.g. nitrogen, $O_2$, $CO_2$ and ethylene, in desired proportions.

For further details of MAP and CAP, reference may be made, for example, to U.S. Pat. No. 3,360,380 (Bedrosian), U.S. Pat. No. 3,450,542 (Badran), U.S. Pat. No. 3,450,544 (Badran et al.), U.S. Pat. No. 3,798,333 (Cummin et al), U.S. Pat. No. 3,924,010 (Erb), U.S. Pat. No. 4,003,728 (Rath), U.S. Pat. No. 4,734,324 (Hill), U.S. Pat. No. 4,779,524 (Wade), U.S. Pat. No. 4,830,863 (Jones), U.S. Pat. No. 4,842,875 (Anderson), U.S. Pat. No. 4,879,078 (Antoon), U.S. Pat. No. 4,910,032 (Antoon), U.S. Pat. No. 4,923,703 (Antoon), U.S. Pat. No. 4,987,745 (Harris), U.S. Pat. No. 5,041,290 (Wallace et al.) U.S. Pat. No. 5,045,331 (Antoon), U.S. Pat. No. 5,063,753 (Woodruff), U.S. Pat. No. 5,160,768 (Antoon), U.S. Pat. No. 5,254,354 (Stewart), U.S. Pat. No. 5,333,394 (Herdeman), U.S. Pat. No. 5,433,335 (Raudalus et al.), U.S. Pat. No. 5,443,851 (Christie et al.), U.S. Pat. No. 5,460,841 (Herdeman), U.S. Pat. No. 5,556,658 (Raudalus et al.), U.S. Pat. No. 5,658,607 (Herdeman), U.S. Pat. No. 5,807,630 (Christie et al.), U.S. Pat. No. 5,832,699 (Zobel), U.S. Pat. No. 5,872,721 (Huston et al.), U.S. Pat. No. 6,013,293 (De Moor), U.S. Pat. No. 6,190,710, U.S. Pat. No. 6,210,724 (Clarke et al.), U.S. Pat. No. 6,296,923 (Zobel), U.S. Pat. No. 6,376,032 (Clarke et al.) and U.S. Pat. No. 6,548,132 (Clarke et al.); copending commonly assigned U.S. patent application Ser. No. 09/121,082 (Clarke et al.), Ser. No. 09/580,379 (Clarke), Ser. No. 09/858,190 (Clarke), Ser. No. 09/989,682 (Clarke), Ser. No. 09/999,600 (Clarke), 60/435,567 (Clarke et al.), 60/532,025 (Clarke), 60/539,949 (Clarke) and 60/540,121 (Clarke et al.); US Patent Application Publication Nos. US 2002/0127305 (Clarke) and 2003/0057217 (Wyslotsky); International Publication Nos. WO 94/12040 (Fresh Western), WO 96/38495 (Landec), WO 00/04787 (Landec), WO 01/92118 (Landec) and WO 03/043447 (Landec); and European Patent Applications Nos. 0,351,115 and 0,351,116 (Courtaulds). The disclosure of each of those patents, applications and publications is incorporated herein by reference for all purposes.

The known ACMs, when in use, form part of the exterior surface of the sealed container. The term "exterior surface of the container" is used herein to denote a surface of the container which can be contacted during normal handling of the container. The ACM, therefore, is liable to be damaged during handling of the container; is in direct communication with the air (or other atmosphere) surrounding the sealed container; and is discarded with the container after the container has been opened and the contents removed.

SUMMARY OF THE INVENTION

This invention provides a number of ways in which the value of ACMs can be increased.

A first aspect of the invention provides a method of increasing the concentration of a gas in a first atmosphere and decreasing the concentration of said gas in a second atmosphere, the method comprising
  (A) providing an atmosphere control member (ACM) having first and second surfaces; and
  (B) placing the first atmosphere adjacent the first surface and the second atmosphere adjacent the second surface, the first and second atmospheres containing different proportions of said gas (including the possibility that one of the atmospheres contains substantially none of said gas);
wherein at least one of the first and second atmospheres flows over the surface of the ACM adjacent thereto. The method preferably has at least one (i.e. one or more) of the characteristics (i) to (v) set out below, and/or at least one of the characteristics (a) to (d) set out below.

The preferred characteristics (i) to (v) of the method referred to above are:—
  (i) One of the first and second atmospheres contains p % by volume of $CO_2$, where p is at least 3, e.g. 3-15, and the other atmosphere contains less than p %, e.g. 0-5%, preferably substantially 0%, by volume of $CO_2$.
  (i) One of the first and second atmospheres contains q % by volume of $O_2$, where q is at least 15, e.g. 15-25, preferably substantially 21, and the other atmosphere contains less than q %, e.g. 2-15% or 3-10%, by volume of $O_2$.
  (iii) One of the atmospheres is an atmosphere within a sealed container containing a respiring biological material, e.g. (a) a packaging atmosphere in direct contact with the respiring biological material, or (b) an intermediate atmosphere in contact with the exteriors of a plurality of sealed containers, each of which includes a second ACM and contains a respiring biological material; and the other atmosphere is air or oxygen-enriched air.
  (iv) The rate at which at least one of the atmospheres flows over the surface of the ACM is changed, discontinuously or continuously (e.g. in response to one or more sensors which measure the concentration of at least one gas in at least one of the atmospheres before and/or after one or both of the atmospheres have flowed over the ACM), the rate preferably being one or more of
    (a) the volume of the atmosphere passing through a closed chamber including the ACM, and
    (b) the average speed at which the atmospheres flows over the ACM.

(v) The ACM is part of a closed chamber and one of the atmospheres is caused to flow through the chamber, and preferably the method has one or more of the following features (va) the atmosphere flows through the chamber at a rate of 5-500, e.g. 10-300 or 20-200 cfm (0.14-14, e.g. 0.28-8.4 or 0.56-5.6 m³/min), (vb) the atmosphere flows through the chamber from at least one inlet to at least one outlet, the inlet and outlet being placed so that a straight-line joining the inlet and the outlet crosses the ACM, the atmosphere preferably flowing at a rate such that the average speed of the atmosphere flowing across the ACM (defined as the volume of the atmosphere passing through the chamber per minute divided by the cross-section of the chamber at right angles to said straight line) is 50 to 5000, e.g. 200 to 2500, inch/min (1.25 to 125, e.g. 5 to 65, m/min), (vc) the atmosphere flows through the chamber at a rate such that the volume of the atmosphere flowing through the chamber is 0.0025 to 0.25, e.g. 0.005 to 0.1 or 0.005 to 0.04, ft³ per in² (0.06 to 6.4, e.g. 0.12 to 2.5 or 0.12 to 1.0 mm³ per mm²) of ACM exposed to said atmosphere, (vd) the chamber is a rectangular parallelepiped which comprises two major faces and four minor faces; and in which at least one of the major faces includes an ACM, a first minor face includes at least one inlet for an incoming atmosphere in, and a second minor face opposite the first minor face includes at least one outlet for an outgoing atmosphere, and (ve) the chamber comprises (i) a generally cylindrical surface which comprises the ACM, and (ii) two opposite end faces, one of the end faces including at least one inlet for an incoming atmosphere and the other of the end faces including at least one outlet for an outgoing atmosphere.

The preferred characteristics (a) to (d) of the method referred to above are:—

(a) The area of the ACM is at least 100 in² (0.06 m²), particularly at least 1000 in² (0.65 m²), for example an area of 100 to 20,000 in² (0.06 to 13 m²), for example 1000 to 10,000 in² (0.65 to 6.5 m²).

(b) One of the atmospheres is the atmosphere within a container having a volume of at least 1 m³, particularly at least 40 m³, for example a shipping or trucking container, and the other atmosphere is preferably air or oxygen-enriched air.

(c) The ACM comprises a microporous film having a polymeric coating thereon.

(d) Step (A) comprises providing a first ACM having a relatively low R ratio, e.g. of 1 to 2.3 or 1.3 to 2.0 and a second ACM having a higher R ratio, e.g. of 1.5 to 5.0, or 2.0 to 4.0, or 2.3 to 3.0; and step (B) comprises a step (B1) in which the atmospheres are placed adjacent to the first ACM and a step (B2), which may be before or after step (B1), in which the atmospheres are placed adjacent to the second ACM.

In a second aspect of the invention, a respiring biological material is stored (the term "stored" being used to include "ripened") in a sealed container having an "internal" ACM. The term "internal ACM" is used herein to denote an ACM having a first, inner, surface which is in contact with the atmosphere within the container, and a second, outer, surface which is not part of the exterior surface of the container. Often, the internal ACM is positioned so that it is not possible to draw a straight line from any point on the exterior surface of the container to any point on the ACM without passing through a solid component. For example, the internal ACM can be separated from the outer atmosphere by a valve or other device for controlling access of the outer atmosphere to the internal ACM. However, other arrangements are possible. For example, the internal ACM can lie between the respiring biological material and an apertured member, e.g. a metal grille, which is part of the exterior surface of the container. In use, the outer surface of the ACM must be in gaseous communication with an outer gaseous atmosphere, so that the ACM can perform its function of helping to produce a desired atmosphere within the container. The outer gaseous atmosphere can be air or another gas (the term "gas" is used herein to denote a single gas or a mixture of gases).

A preferred embodiment of the second aspect of the invention is a container system comprising (1) a sealed container having an exterior surface, and (2) within the sealed container, a respiring biological material and an inner atmosphere, the container having an internal atmosphere control member (ACM) which, when gases are passing through the ACM, has (a) a first surface which is in direct contact with the inner atmosphere, and (b) a second surface which is not in direct contact with the inner atmosphere and is not part of the exterior surface of the container.

The container system can be used to carry out the method of the first aspect of the invention, or other methods. The container system preferably has at least one of the characteristics (a) to (i) as set out below.

The preferred characteristics (a) to (i) of the container system referred to above are:—

(a) It comprises pressure-generating means for supplying gas to the second surface of the ACM.

(b) It comprises a metering device for changing the rate at which gas can be supplied to the second surface of the ACM.

(c) It comprises a plurality of sources of different gases and a corresponding plurality of metering devices for changing the rate at which gas can be supplied from each of the sources to the second surface of the ACM.

(d) It comprises a plurality of internal ACMs corresponding to the plurality of separate sources of different gases, each chamber comprising one of the plurality of the internal ACMs, the internal ACMs preferably having different permeability characteristics.

(e) The internal ACM is part of a module, preferably a reusable module, which has been assembled separately from the container, e.g. a module including a rigid frame, preferably a module which is secured inside a container having at least one rigid wall.

(f) The respiring biological material is placed within the container without any additional packaging or in packaging which has no substantial effect on the atmosphere in direct contact with the biological material.

(g) The respiring biological material is packed in a plurality of ACM-containing sealed inner containers, and the inner containers are placed within the sealed container having the internal ACM.

(h) The ACM comprises a microporous film having a polymeric coating thereon.

(i) The respiring biological material is bananas.

A third aspect of the invention provides methods and apparatus for changing, preferably reversibly changing, the effect produced by an ACM on the atmosphere within a sealed container. In one embodiment of this aspect, gases are blown over the outer surface of the ACM, as for example in the first aspect of the invention. In another embodiment, a retractable cover is moved to change the physical size of the ACM. Another embodiment makes use of a plurality of different ACMs, which may have the same or different sizes, to which the access of gas can be independently controlled.

A fourth aspect of the invention is a module, preferably a reusable module, which comprises a closed chamber including an ACM, an inlet for gas and an outlet for gas. Such a module is useful in the first, second and third aspects of the invention. A module preferably has one or more of the characteristics (a) to (d) set out below The preferred characteristics (a) to (d) of the module referred to above are:—
   (a) It comprises a rigid frame.
   (b) The inlet and outlet are placed so that a straight line joining the inlet and the outlet crosses the ACM.
   (c) The chamber is a rectangular parallelepiped which comprises two major faces and four minor faces; and in which at least one of the major faces includes an ACM, a first minor face includes at least one inlet for incoming gases, and a second minor face opposite the first minor face includes at least one outlet for outgoing gases.
   (d) The chamber comprises (i) a generally cylindrical surface which comprises the ACM, and (ii) two opposite end faces, one of the end faces including at least one inlet for an incoming atmosphere and the other of the end faces including at least one outlet for an outgoing atmosphere.

In a fifth aspect of the invention, a respiring biological material is stored in a first sealed container having substantial permeability, and preferably including an ACM, and one or more first sealed containers are placed within a second sealed container which includes an ACM (which can be a conventional ACM and/or an internal ACM). One embodiment of the fifth aspect of the invention is an assembly for storing (including ripening) a respiring biological material, the assembly comprising
   (1) an outer sealed gas-permeable container, and
   (2) within the outer sealed container, at least one sealed inner package comprising
      (a) a sealed inner gas-permeable container, and
      (b) within the sealed inner container, a respiring biological material and a packaging atmosphere around the biological material;
at least one of the outer container and the inner container including an ACM. The assembly preferably has at least one of the characteristics (a) to (f) set out below.

The preferred characteristics (a) to (f) of the assembly referred to above are:—
   (a) Each of the inner and outer containers includes an ACM.
   (b) At least one of the inner container and the outer container includes a non-selective ACM, for example 1 to 10 holes of 50 to 600 gauge.
   (c) The inner container includes a selective ACM and the outer container includes a non-selective ACM, or the outer container includes a selective ACM and the inner container includes a non-selective ACM.
   (d) There are at least 10, e.g. at least 20, substantially identical inner packages,
   (e) The outer container includes an internal ACM.
   (f) The packaging atmosphere contains 4-12% $O_2$ and 14-16% $CO_2$, or 10-15% $O_2$ and 8-13% $CO_2$.

Another embodiment of the fifth aspect of the invention is a method of storing (including ripening) a respiring biological material, the method comprising (A) preparing an assembly as just defined, and
   (B) maintaining the assembly at a temperature, e.g. a temperature of 2-5° C. and in an ambient atmosphere surrounding the outer container such that the packaging atmosphere has a desired composition.
The method can include
   (C) after step (B), unsealing the outer container and storing the inner container in air, e.g. air at 18-21° C.

BRIEF DESCRIPTION OF THE DRAWINGS

The invention is illustrated in the accompanying drawings, which are diagrammatic; which are not, except for FIG. 6, to scale; in which the same reference numerals are used to denote the same or similar components; and in which
FIG. 1 is a perspective view.

DETAILED DESCRIPTION OF THE INVENTION

In the Summary of the Invention above and in the Detailed Description of the Invention, the Examples, and the Claims below, reference is made to particular features (including method steps) of the invention. It is to be understood that the disclosure of the invention in this specification includes all appropriate combinations of such particular features. For example, where a particular feature is disclosed in the context of a particular aspect or embodiment of the invention, or a particular claim, that feature can also be used, to the extent appropriate, in combination with and/or in the context of other particular aspects and embodiments of the invention, and in the invention generally.

The term "comprises" and grammatical equivalents thereof are used herein to mean that other elements (i.e. components, ingredients, steps etc.) are optionally present. For example, a structure "comprising" (or "which comprises") components A, B and C can contain only components A, B and C, or can contain not only components A, B and C but also one or more other components.

The terms "a", "an" and "the" before an item are used herein to mean that there can be a single such item or two or more such items, unless the context makes this impossible. For example, where reference is made to a container including an ACM, this includes the possibility that the container includes one ACM or a plurality of ACMs; similarly where reference is made to a module having a wall comprising an ACM, this includes the possibility that there are two or more such walls, and that each such wall comprises one or more ACMs. The term "consisting essentially of" and grammatical equivalents thereof is used herein to mean that other elements may be present which do not materially alter the disclosed invention. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility. The term "at least" followed by a number is used herein to denote the start of a range beginning with that number (which may be a range having an upper limit or no upper limit, depending on the variable being defined). For example "at least 1" means 1 or more than 1, and "at least 80%" means 80% or more than 80%. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)", this means a range whose lower limit is the first number and whose upper limit is the second number. For example, "from 2 to 16 $m^3$" or "2-16 $m^3$" means a range whose lower limit is 2 $m^3$ and whose upper limit is 16 $m^3$. The numbers given herein should be construed with the latitude appropriate to their context and expression. The term "plurality" is used herein to mean two or more.

In describing and claiming the invention below, the following abbreviations, definitions, and methods of measurement (in addition to those already given) are used.

OTR and COTR values are given in ml/$m^2$.atm.24 hr, with the equivalent in cc/100 $inch^2$.atm.24 hrs in parentheses, and can be measured using a permeability cell (supplied by Millipore) in which a mixture of $O_2$, $CO_2$ and helium is applied to the sample, using a pressure of 0.035 kg/$cm^2$ (0.5 psi), and the gases passing through the sample are analyzed for $O_2$ and $CO_2$ by a gas chromatograph. The cell could be placed in a water bath to control the temperature. The abbreviation $P_{10}$ is used to mean the ratio of the permeability, to $O_2$ or $CO_2$ as specified, at a first temperature $T_1°$ C. to the permeability at a second temperature $T_2$, where $T_2$ is ($T_1$-10° C. $T_1$ being 10° C. and $T_2$ being 0° C. unless otherwise noted. The abbreviation R or R ratio is used to mean the ratio of COTR to OTR, both permeabilities being measured at 20° C. unless otherwise noted. Pore sizes are measured by mercury porosimetry. Parts and percentages are by weight, except for percentages of gases, which are by volume. Temperatures are in degrees Centigrade. For crystalline polymers, the abbreviation $T_o$ is used to mean the onset of melting, the abbreviation $T_p$ is used to mean the crystalline melting point, and the abbreviation AH is used to mean the heat of fusion. $T_o$, $T_p$ and AH are measured by means of a differential scanning calorimeter (DSC) at a rate of 10° C./minute and on the second heating cycle. $T_o$ and $T_p$ are measured in the conventional way well known to those skilled in the art. Thus $T_p$ is the temperature at the peak of the DSC curve, and $T_o$ is the temperature at the intersection of the baseline of the DSC peak and the onset line, the onset line being defined as the tangent to the steepest part of the DSC curve below $T_p$.

Where reference is made herein to sealed packages and sealed containers, and to sealing containers containing biological materials, it is to be understood that the sealing can be, but need not be, hermetic sealing. Conventional methods for sealing containers can conveniently be used in this invention. If the container is sealed hermetically, it will generally be desirable to include one or more apertures in the container, the area of the apertures being large enough to achieve equilibration of the pressures inside and outside the container, but small enough to have an insubstantial influence on the permeability of the container.

Atmosphere Control Members (ACMs)

The term "atmosphere control member" (often abbreviated herein to ACM) is used herein to denote any member which modifies the rates at which oxygen and carbon dioxide pass into and out of a sealed container, and which thus insures that the atmosphere within the container is different from the ambient atmosphere surrounding the container, which is usually air, but can be a controlled atmosphere other air. An ACM can for example be placed over a window in the container, or can be an integral part of the container. A container can include two or more ACMs, which can be the same or different. The ACM is preferably such that at 22° C. at least 50%, generally at least 75%, of the oxygen entering the packaging atmosphere passes through the ACM; and the ACM can provide substantially the only pathways for oxygen and carbon dioxide to enter or leave the inner atmosphere. Preferably the ACM is such that after 24 hours, the packaging atmosphere contains less than 18% oxygen, e.g. 2-15% oxygen.

An ACM can for example comprise (i) a nonwoven material, optionally having a polymer coating thereon, as described for example in U.S. Pat. No. 5,045,331 (Antoon); (ii) a microporous film, optionally having a polymeric coating thereon, as described for example in U.S. Pat. Nos. 4,879,078, 4,842,875, 5,160,768 and 6,376,032; or (iii) one or more perforations (which may be close together or spaced-apart) having a size such that they control the packaging atmosphere, as described for example in U.S. Patent Publication No. 2003/0057217, U.S. Pat. Nos. 5,832,699 and 6,296,923, and European Application 0351116. ACMs comprising a nonwoven material having a polymeric coating thereon or a microporous film having a polymeric coating thereon have an R ratio greater than 1, and are referred to herein to as selective ACMs. An ACM in the form of perforations has an R ratio of 1, and is referred to herein as a non-selective ACM. A nonselective ACM can for example comprise a single relatively large perforation and/or a plurality of relatively small perforations, e.g. having a size of 10 to 1000 mu., e.g. 50 to 600 mu, for example a film microperforated with holes of 0.3 to 0.8 mm diameter in a density of up to about 500 holes per square meter.

The size and permeability characteristics of the ACM or ACMs are selected with reference to the type and quantity of the respiring biological material and the desired packaging atmosphere. By controlling the access of gas to the ACM, or to one more of a plurality of ACMs, the packaging atmosphere can be varied or maintained constant over time.

An ACM used in the present invention can be, for example, the same per unit area as one of the ACMs disclosed in the documents incorporated herein by reference. It is preferred to use selective ACMs composed of microporous films having a coating thereon of a suitable polymer, e.g. a sharply-melting crystalline polymer or a polysiloxane. The ACM preferably has an OTR of at least 775,000 (50,000), particularly at least 1,550,000 (100,000), e.g. at least 2,325,000 (150,000). For some uses, a higher OTR, e.g. at least 7,750,000 (500,000), e.g. at least 13,590,000 (900,000), is preferred. In some cases, it is preferred to use an ACM having an R ratio of at least 1.5, particularly at least 2.5, e.g. at least 3. In some cases it is preferred that the ACM has an oxygen $P_{10}$ ratio, over at least one 10° C. range between −5 and 15° C., of at least 1.3, e.g. at least 2.6.

When the ACM includes a microporous polymeric film which serves as a support for the polymeric coating, the microporous film comprises a network of interconnected pores such that gases can pass through the film. Preferably the pores have an average pore size of less than 0.24 micron. Other optional features of the microporous film include
(a) at least 70%, e.g. at least 90%, of the pores having a pore size of less than 0.24 micron;

(b) at least 80% of the pores have a pore size less than 0.15 micron;
(c) less than 20% of the pores have a pore size less than 0.014 micron;
(d) the pores constitute 35 to 80% by volume of the microporous film;
(e) the microporous film comprises a polymeric matrix comprising ultrahigh molecular weight polyethylene or polypropylene;
(f) the microporous film contains 30 to 90% by weight, based on the weight of the film, of a finely divided particulate substantially insoluble filler, preferably a siliceous filler, which is distributed throughout the film;
(e) the microporous film is prepared by treating an extruded and calendered sheet comprising a powdered polymeric matrix material, a filler, and a processing oil with an organic extraction liquid to remove the processing oil; followed by extraction of the extraction liquid with water or steam.

Suitable microporous films are available under the tradename Teslin.

In some cases, the polymeric matrix of the coating on the microporous film preferably comprises, and may consist essentially of, a crystalline polymer, preferably an SCC polymer. The use of a crystalline polymer results in an increase in the $P_{10}$ values in the melting region of the polymer. The SCC polymer can comprise, and optionally can consist of, units derived from (i) at least one n-alkyl acrylate or methacrylate (or equivalent monomer, for example an amide) in which the n-alkyl group contains at least 12 carbon atoms, e.g. 12-50 carbon atoms, for example in amount 35-100%, preferably 50-100%, often 80-100%, and optionally (ii) one or more comonomers selected from acrylic acid, methacrylic acid, and esters of acrylic or methacrylic acid in which the esterifying group contains less than 10 carbon atoms. The SCC polymer can also include units derived from a diacrylate or other crosslinking monomer. The preferred number of carbon atoms in the alkyl group of the units derived from (i) depends upon the desired melting point of the polymer. For the packaging of biological materials, it is often preferred to use a polymer having a relatively low melting point, for example a polymer in which at least a majority of the alkyl groups in the units are derived from (i) and contain 12 and/or 14 carbon atoms. The SCC polymer can be a block copolymer in which one of blocks is a crystalline polymer as defined and the other block(s) is crystalline or amorphous, for example a block copolymer comprising (i) polysiloxane polymeric blocks, and (ii) crystalline polymeric blocks having a $T_p$ of −5 to 40° C.

The polymeric matrix of the coating can also consist of or contain other crystalline and amorphous polymers. Examples of such other polymers include cis-polybutadiene, poly(4-methylpentene), polysiloxanes including polydimethyl siloxane, and ethylene-propylene rubber. Polysiloxanes are particularly useful when high permeabilities, e.g. an OTR of at least 500,000 or at least 900,000 cc/100 inch$^2$.atm.24 hrs, are desired.

The present invention can advantageously make use of ACMs which are substantially larger than ACMs used in the past. For example, the ACM optionally has an area greater than 0.06 m$^2$ (100 in$^2$), e.g. greater than 0.65 m$^2$ (1000 in$^2$). In some embodiments, the ACM has an area of 0.06 to 13 m$^2$ (100 to 20,000 in2), for example 0.65 to 6.5 m$^2$ (1000 to 10,000 in$^2$).

The ACM can be part of a chamber to which the access of gas can be controlled. The control can be over any one or more of the variables which will affect the performance of the ACM, including the amount of gas, the type of gas and the flowrate of the gas over one or both of the faces of the ACM. The total gas pressure within, and the rate of gas flow through, the chamber can be controlled, for example, through the use of one or more devices to control access to, and/or egress from, the chamber. Such devices include, for example, compressors, pumps, valves, and other metering devices. The ingredients of one of the atmospheres, and the proportion of each ingredient, can be controlled, for example, by feeding different gases into the chamber at controlled rates. The access of gas can be controlled by reference to data received from one or more sensors within the container and/or the gas supply and/or the gas leaving the chamber. There can for example be continuous interactive control of pumps and/or valves controlling the gas supply via a feedback loop comprising one or more sensors of gas levels, e.g. oxygen and/or $CO_2$ level, in the atmosphere within the container. The control systems disclosed in U.S. Pat. No. 5,460,841 (Herdeman) and U.S. Pat. No. 5,872,721 (Huston et al.), adapted to the requirements of the present invention, can for example be used.

There can be two or more different chambers, each containing an ACM. The ACMs in the different chambers can be the same or different, and the access of gas to the different chambers can be controlled in the same or different ways. In one embodiment, there are two or more chambers, one or more of the chambers containing an ACM having a relatively low ratio, e.g. 1 to 2.3 or 1.3 to 2.0, and one or more other chambers, each containing an ACM having a higher R ratio, e.g. 1.5 to 5, or 2.0 to 4.0, or 2.3 to 3.0. In this embodiment, the average R ratio can be changed from time to time by changing the flow rate through the different chambers. In another embodiment, when a fixed R ratio is needed and an ACM having that R ratio is not available, two ACMs having different R ratios (and if necessary different sizes) can be part of the same chamber.

Containers

The present invention can be used with any type of container. The walls of the container can be rigid or flexible, or some of the walls can be rigid and others flexible. The walls can be composed of any material, for example metal, wood, or a polymeric material. Some or all of the walls can be substantially impervious to one or more of $O_2$, $CO_2$, water vapor and any other gas important to the storage of the respiring biological material; or some or all of the walls can have a limited permeability to such gases.

The invention is particularly useful when the container (the outer container in the fourth aspect of the invention) is relatively large, for example has a capacity of at least 1 m$^3$, for example 2-100 m$^3$. Examples of such containers are conventional shipping and transportation containers, which are generally composed of metal, have a volume of at least 40 m$^3$, typically about 43 or about 86 m$^3$, and can be loaded onto a ship or a truck. Such containers are well known to those skilled in the art of storing and transporting fruits and vegetables, and are available in a range of standard sizes. Such containers may be fitted with the piping and gas supplies needed for conventional refrigeration and/or CAP procedures, and can readily be adapted for use in the present invention. The container can also be a room in a building, e.g. a ripening room, i.e. a room in which a respiring biological material is exposed to ethylene or another gaseous ripening agent.

Temperatures During Storage

The temperature during storage of the respiring biological material will often have an effect on the respiration of the biological material and/or the permeabilities of the ACM to at least some gases. The temperature can be substantially constant, for example a temperature used in storage under refrigeration, e.g. 2-6° C., or can be at a first level during a first storage period and at a different level, e.g. 18-22° C., during one or more other storage periods before or after that storage.

Blowing Gases Over ACMs (the First Aspect of the Invention)

As noted above, optional features of the first aspect of the invention include those set out in subparagraphs (i)-(v) and (a)-(d) above.

Using Internal ACMs (the Second Aspect of the Invention)

As noted above, optional features of the second aspect of the invention include those set out in subparagraphs (a)-(i) above.

In some embodiments of the second aspect of the invention, the respiring biological material is placed within the container without any additional packaging, or in packaging which does not affect the atmosphere around the biological material, e.g. in cardboard boxes or in polymeric bags or containers which are open or have large perforations. In these embodiments, the atmosphere within the container will be the same as the packaging atmosphere in direct contact with the respiring biological material. However, it is also possible, when the first and fourth aspects of the invention are combined, for the respiring biological material, before it is placed in an outer container having an internal ACM, to be packaged in one or more containers which include a conventional selective ACM, and/or which are conventionally perforated. The packaging atmosphere around the biological material) will then reflect the permeability of both the outer container and the permeability of the conventional inner container(s).

When an ACM is part of the exterior surface of a container, there is a risk that the ACM will be physically damaged during handling, and/or will be partially or completely blocked by an adjacent article pressing against it. An advantage of the second aspect of the invention is a reduction of that risk. The internal ACM can be placed near a wall of the container or in a relatively central position. A plurality of internal ACMs can be distributed through the volume enclosed by the container. Some containers, in particular refrigerated containers are equipped to circulate the atmosphere within the container. In such containers, the positioning of the internal ACM within the container has little effect on its ability to control the atmosphere.

The internal ACM, or each of the internal ACMs when there are two or more internal ACMs, can for example have one or more of the following characteristics.
(a) It has an invariable effective size.
(b) It is associated with means for changing, preferably reversibly changing, its effective size, for example a retractable cover.
(c) It is connected to a means for changing, preferably reversibly changing, the rate at which gas is supplied to the second surface of the ACM (including means which prevents gas from being supplied to the second surface).
(d) It is connected to a means for changing, preferably reversibly changing, the chemical constitution of gas supplied to the second surface of the ACM.
(e) It is supported by a support member, e.g. a metal grille, which is sufficiently permeable to gas that it has substantially no effect on the ACM except to reduce its effective area. For example, the ACM can be sandwiched between two such support members. The support members are particularly useful if there is a substantial difference between the pressures within and outside the container, in order to avoid distortion of the ACM by the pressure difference. Preferably, the pressure difference is small, e.g. less than 0.3 in. of water.

When there are two or more internal ACMs, the combination of ACMs can for example have at least one of the following characteristics.
(a) All the ACMs have substantially the same permeability (per unit area) to at least one gas; for example all the ACMs are substantially identical per unit area.
(b) At least one of the internal ACMs has a permeability (per unit area) to at
least one gas which is different from that of at least one of the other internal ACMs. For example, the ACMs can have different R ratios.
(c) All the ACMs are connected to the same source of gas; optionally, at least one of the ACMs is connected to a means for changing, preferably reversibly changing, the rate at which gas is supplied to that ACM.
(d) At least one of the ACMs is connected to a source of first gas, and at least one of the other ACMs is connected to a source of a second gas;
optionally, at least one of the ACMs is connected to a means for changing, preferably reversibly changing, the rate at which one of the gases is supplied to that ACM.

Optionally, in order to protect the internal ACM from physical damage, for example from the respiring biological material or packages containing the respiring biological material, it can be covered by an apertured member, e.g. a metal grille, which provides the desired physical protection during handling but has little or no effect on the ACMs ability to control the atmosphere within the container. The apertured member can be spaced apart from the ACM or can also serve as a support member for it.

Combinations of Internal ACMs and Conventional ACMs

The internal ACM or plurality of internal ACMs can be used in combination with one or more conventional ACMs forming part of the exterior surface of the container. The atmosphere within the container will then be controlled both by the internal ACM(s) and the external ACM(s).

Modules

The ACM is preferably part of the module comprising a chamber having (1) an inlet for gas, (2) an outlet for gas, and (3) a wall comprising an ACM. It is often convenient for the module to be constructed separately from the container, and then put in place before, during or after placement of the respiring biological material in the container. In use, the inlet is connected by a conduit to one or more sources of gas, and the outlet is connected by a conduit to appropriate gas disposal means (in many cases, simply the atmosphere). Optionally, some or all of these conduits are part of the preassembled module. Any other needed conduits can be part of the container before the module is placed in it, and/or can be added after the module has been put in place.

The module can be of any shape. The shape can suitably be defined by a rigid frame, composed for example of one or more of metal, wood and polymeric materials. Often it is convenient for the module to be generally box-shaped, for example a box having two major faces defined by two relatively large dimensions, and four minor faces defined by one of the large dimensions and a relatively small dimension. For example, each of the large dimensions can be 0.3-12 m (1-40 ft), e.g. 2-6 m. (6-20 ft) a, and the small dimension can be 0.02-0.5 m (1-20 in.) e.g. 0.05-0.25 m (2-9 in). At least one of the faces of the module, for example one or both of the major faces of a box-shaped module, comprises an aperture which is covered by an ACM.

The module can be attached permanently or semi-permanently to a container, in which case it is not removed from that container when the biologically respiring material is placed within, or removed from, the container. Alternatively, the module can be one which is removed from the container, after the container has been unsealed, and before, during or after removal of the biologically respiring material; and is later reused, by being placed within the original container or in a second container, before, during or after the biologically respiring material is placed therein. In this way, it is possible for a container, which has been used to ship goods which do not require atmosphere control, to be unloaded and then to be used, in a further journey, to ship respiring biological materials or other goods that require atmosphere control during shipping.

Respiring Biological Materials

This invention is useful for the storage of a wide variety of respiring biological materials, including for example asparagus, avocado, broccoli, cantaloupe melons, cherries, mangos and papayas. Suitable materials include the wide range of fruits which ripen (or undergo other changes, for example, in the case of citrus fruits, de-greening) when exposed to ethylene or another ripening agent, for example apples, apricots, avocados, bananas, blueberries, cherimoyas, dates, figs, kiwis, mangos, melons, peaches, papayas, pears, peppers, persimmons, and plums (all of which go through a climacteric when they ripen), as well as cherries, grapes, lemons, oranges, tomatoes and strawberries. Some aspects of the invention are especially useful for fruits which in commercial practice are ripened in ethylene-containing ripening rooms, for example avocados, bananas, Bartlett pears, kiwis, mangos, melons, peppers and tomatoes. The invention is particularly useful for the storage of bananas, in particular while they are being transported from the sites at which they are grown to the sites at which they are sold. The present invention makes it easier to control the development of the bananas (from the green state in which they are initially packed to the post-climacteric state in which they are sold at retail) in response to changes in respiration rate, shipping times and the demands of the retail marketplace. For example, there can be two internal ACMs, of the same or different sizes, for example, a relatively small ACM which is initially the only ACM connected to the atmosphere, and a relatively large ACM which is additionally connected to the atmosphere when ripening of the bananas is desired.

Fifth Aspect of the Invention (atmosphere control "in series")

The fifth aspect of the invention provides another way of controlling the packaging atmosphere around respiring biological materials. In this aspect, at least one inner sealed container which contains a respiring biological material and has substantial permeability is placed within an outer sealed container which includes an ACM. The packaging atmosphere around the biological material in the inner container then depends on the permeability of the inner container to gases passing between the packaging atmosphere and the atmosphere which lies between the inner and outer containers (which is referred to herein as the "intermediate" atmosphere); and the intermediate atmosphere depends upon the permeability of the outer container to gases passing between the intermediate atmosphere and the atmosphere which surrounds the outer container (which is referred to herein as the "ambient" atmosphere). The inner and outer containers can be regarded as being connected "in series" to determine the packaging atmosphere. In this way, it is possible to produce packaging atmospheres which cannot be obtained using a single container.

In preferred embodiments of the fifth aspect of the invention, the outer container encloses a plurality of inner containers (e.g. at least 10 or at least 20 inner containers). Generally the inner containers are substantially identical containers which contain substantially the same amount of the same biological material. When a plurality of inner containers is placed within a single outer container, the inner containers may for example have a volume which is 0.001 to 0.01 times the volume of the outer container. The absolute size of the inner containers can vary widely; for example the inner container can contain less than 0.5 kg (1 lb). of respiring biological material, e.g. green beans, up to 25 kg (50 lb) or more of respiring biological material, e.g. bananas.

The inner container preferably includes at least one ACM. The permeability characteristics of the inner container, in particular the size and permeability characteristics of the ACM or ACMs in the inner container, are selected with reference to the type and quantity of the respiring biological material, the storage temperature, the desired packaging atmosphere, and the permeability characteristics of the outer container.

When the outer container contains a single inner container, it is preferred that one of the containers, for example the inner container, should be relatively rigid, e.g. a thermoformed container, and that the other should be relatively flexible, e.g. a polymeric bag.

Outer Containers

The outer container can be of any type which can be sealed around the inner container or containers. For example, the outer container can have a capacity as small as, for example, less than $0.0005 \text{ m}^3$ ($30 \text{ in.}^3$), or as large as, for example, more than $1 \text{ m}^3$, e.g. $2\text{-}100 \text{ m}^3$.

The outer container can be a container obtained by modifying a conventional shipping or transportation container (as described above) or a room in a building, e.g. a ripening room, which has been modified to include an ACM, preferably an "internal" ACM in accordance with the first aspect of the invention.

The ACM on the outer container may be a selective ACM and/or a non-selective ACM.

Additional Storage Periods

The storage of the biological material within the inner and the outer containers can be followed by, and/or preceded by, additional storage within the inner container only. During such additional storage, the packaging atmosphere around the biological material depends upon the respiration of the biological material, the permeability of the inner container (which at this stage is the sole container), and the atmosphere surrounding the inner container, which is often air, but may be another desired atmosphere produced using the techniques of CAP. The temperature during storage of the respiring biological material in the inner container only will often have an effect on the respiration of the biological material and/or the permeability of the container to at least some gases. The temperature during such additional storage can be substantially constant, for example a temperature at which the inner containers are displayed for retail sale, e.g. 18-21° C., or can be at a first level during a first additional storage period and at a different level during one or more additional storage periods. The temperature during such additional storage can be the same as or different from the temperature during the storage within both containers.

Combinations of ACMs in the Inner and Outer Containers

The fifth aspect of the invention can make use of different combinations of selective and non-selective ACMs in the inner and outer containers, in particular as set out below. Yet further variation is possible when one or both of the containers contains both selective and nonselective ACMs.

1) The outer container contains a selective ACM and the inner container is perforated.
2) The outer container is perforated, and the inner container contains a selective ACM.
3) The outer container is perforated and the inner container is perforated.
4) The outer container contains a selective ACM and the inner container contains the same or different selective ACM.

The Table below sets out typical intermediate and packaging atmospheres using such combinations of ACMs when the ambient atmosphere is air and when the assembly is refrigerated, e.g. at 2-6° C., and/or when the assembly is at ambient temperature, e.g. at 17-20 2° C.

|   |   | % oxygen in atm. | % $CO_2$ in atm. |
|---|---|---|---|
| 1 | Intermediate | 10-19, e.g. 12-18 | 0.5-8, e.g. 0.8-3 |
|   | Packaging | 6-12, e.g. 8-10 | 7-15, e.g. 8-10 |
| 2 | Intermediate | 3-15, e.g. 8-12 | 6-18, e.g. 9-13 |
|   | Packaging | 1-6. e.g. 2-5 | 8-17, e.g. 12-16 |
| 3 | Intermediate | 3-15, e.g. 8-12 | 6-18, e.g. 9-13 |
|   | Packaging | 2-8, e.g. 3-6 | 13-19, e.g. 15-18 |

Respiring Biological Materials

The fifth aspect of the invention is useful for the storage of a wide variety of respiring biological materials. In one embodiment of the invention, the biological material is one which is normally shipped under refrigeration, e.g. at a temperature of 2-7° C., and which is preferably surrounded during such shipping by a packaging atmosphere having a relatively low $O_2$ content, for example 4-12%, e.g. 5-10%, $O_2$, and a relatively large $CO_2$ content, for example at least 9%, e.g. 14-16%, $CO_2$. Such biological materials include berry fruits, including strawberries, raspberries, blueberries and blackberries, cherries organic grapes and green beans. It is difficult to produce such a packaging atmosphere using conventional MAP techniques, and if a sealed container having such a packaging atmosphere is brought to room temperature, e.g. 20° C., there is a danger that it will become anaerobic, with the consequent risk of dangerous pathogen growth.

In one embodiment of the fifth aspect of the invention, the respiring biological material, e.g. strawberries or another berry fruit, cherries or organic grapes, is placed within a plurality of inner containers, each inner container having a selective ACM such that the container, if surrounded by air, has an equilibrium packaging atmosphere containing about 8-12%, e.g. about 10%, $O_2$, and 9-14%, e.g. about 11%, $CO_2$. These inner containers are placed within an outer container which has an ACM, e.g. a plurality of perforations, such that the biological material, in the absence of the inner containers, would be surrounded by an equilibrium atmosphere of 8-12%, e.g. about 10%, $O_2$, and 9-13%, e.g. about 11%, $CO_2$. The packaging atmosphere around the biological material is then 6-10% $O_2$ and 6-9% $CO_2$.

In another embodiment of the fifth aspect of the present invention, the respiring biological material, e.g. green beans is placed within a plurality of inner containers, each inner container having a plurality of pinholes such that the container, if surrounded by air, has an equilibrium packaging atmosphere containing about 10-15%, e.g. about 12%, $O_2$, and 8-13%, e.g. about 10%, $CO_2$. These inner containers are placed within an outer container which has a selective ACM such that the intermediate atmosphere is 11-15%, e.g. about 13.5%, $O_2$, and 2-6% about 4%, $CO_2$. The packaging atmosphere around the biological material is then 6-12% $O_2$ and 9-16% $CO_2$. At refrigeration temperatures, green beans and similar biological materials will be well preserved while the outer container is sealed. When the outer bag is opened, the packaging atmosphere will become about 10-15%, e.g. about 12%, $O_2$, and 8-13%, e.g. about 10%, $CO_2$. If the temperature of the inner bags is increased to ambient temperatures, for example during or after the retail sale, for example to 65-75° F., the atmosphere in the bags will become 2-3%, e.g. about 2.4, $O_2$ and 18-20% $CO_2$ i.e. will not become anaerobic.

THE FIGURES

Figure 1:
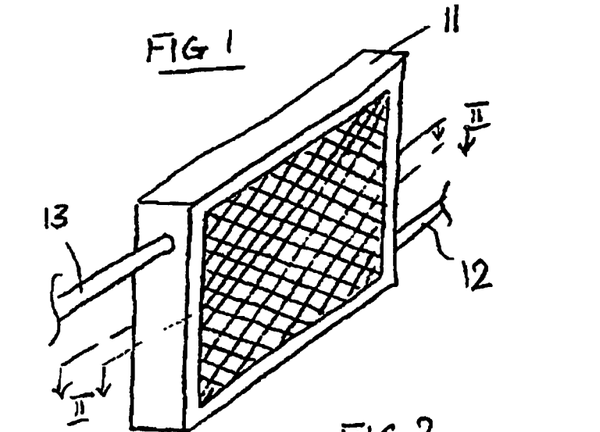
Figure 2:
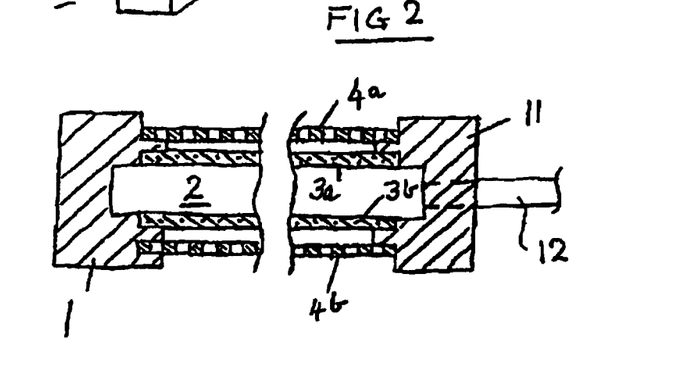
FIG. 2 is an enlarged cross-sectional view, of a module of the invention suitable for use in the middle of a container.

FIGS. 1 and 2 show a module comprising a frame 11 which supports ACMs 3a and 3b. The frame and the ACMs define a chamber 2. Protective metal grilles 4a and 4b are also supported by the frame 11 and cover the outer faces of the ACMs. Flexible inlet pipe 12 and flexible outlet pipe 13 communicate with the chamber 2. In use, the module is placed in a central position in a container; the inlet and outlet pipes pass out of the container through sealed ports; the inlet pipe is connected to a suitable source of gas; and the outer pipe is connected to a suitable disposal source.

Figure 3:
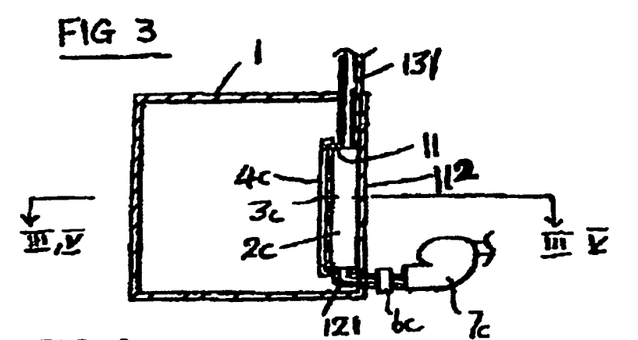
FIG. 3 is a cross-sectional side view of a container system of the invention.
Figure 4:
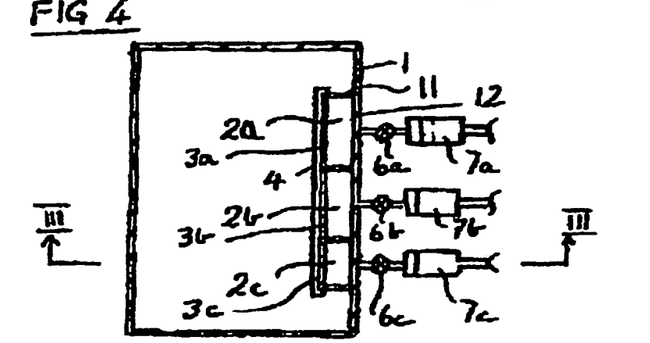
FIGS. 4 and 5 are cross-sectional top view of two different container systems of the invention, each having a cross-sectional side view as shown in FIG. 3.
Figure 5:
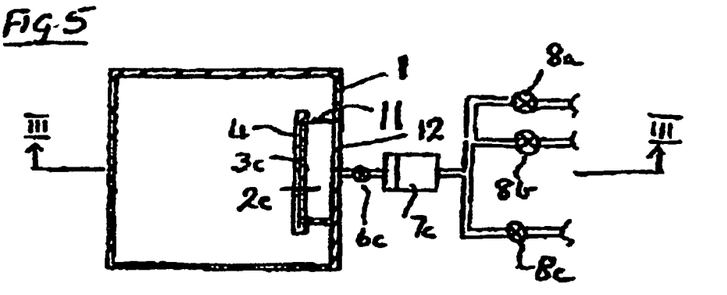

FIG. 3 shows a box-shaped container 1, a side wall 112 of which has permanently attached thereto a module comprising a frame 11 which supports ACM 3c, whose outer surface is protected by metal grille 4c. Inlet pipe 121 and outlet pipe 131 communicate with chamber 2c formed by the frame 11, the ACM 3c and the side wall 112. A pump 7c is connected to a source of gas (not shown) and, via valve 6c, to the inlet pipe 121. The ACM 3c can be one of two or more ACMs, each forming part of a separate chamber into which a pump can supply, via a valve, the same or a different gas. Thus, as shown in FIG. 4, ACMs 3a, 3b and 3c are each part of respective separate chambers 2a, 2b and 2c having separate inlets through which different gases can be supplied by compressors 7a, 7b and 7c via valves 6a, 6b and 6c. The ACM 3c can be the sole ACM and compressor 7 simply connected to the air, so that, in use, a controlled amount of air is passed through the chamber 2c. Alternatively or additionally, the compressor can be connected via respective valves to a variety of different sources of gas, for example, $O_2$, $CO_2$ and ethylene. Thus, as shown in FIG. 5, the compressor 7 can be connected via valves 8a, 8b and 8c to three different sources of gas (not shown).

Figure 6:
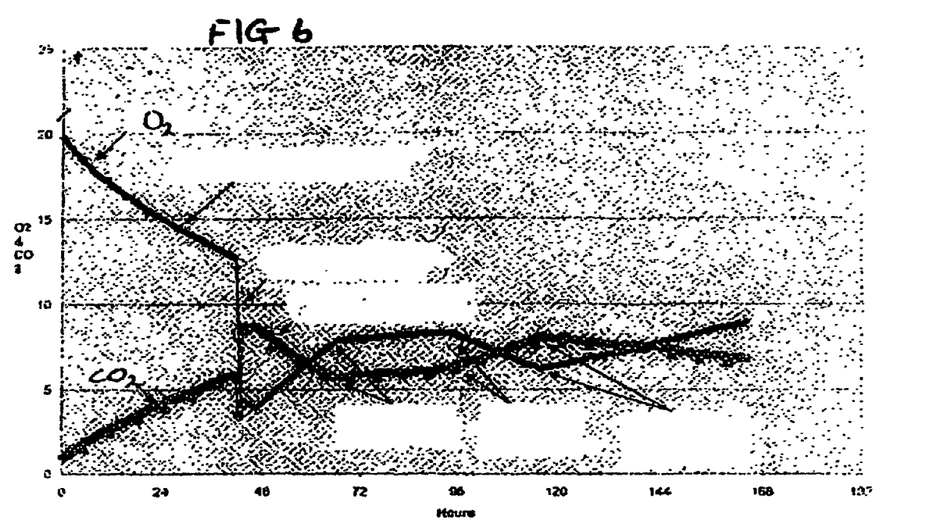
FIG. 6 shows the $O_2$ and $CO_2$ contents of the container in Example 2.

FIG. 6 shows the oxygen and carbon dioxide contents of the container in Example 2, as set out below.

Figure 7:
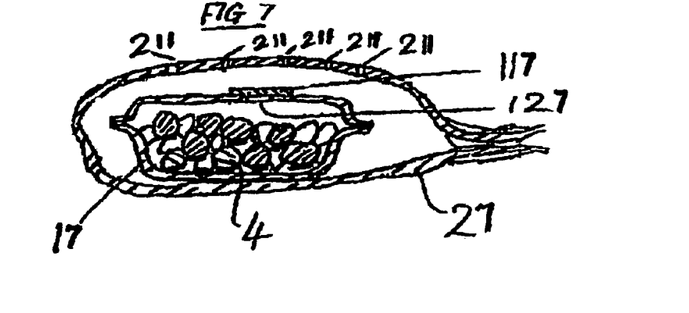
FIGS. 7 and 8 are cross-sectional views of assemblies of the fifth aspect of the invention.

FIG. 7 shows an outer container 27 having a plurality of perforations 211. Within the container 27 is an inner container 17 which has a hole 127 in its lid. The hole 127 is covered by a selective ACM 117. Within the inner container 1 is a respiring biological material 4, for example strawberries.

Figure 8:
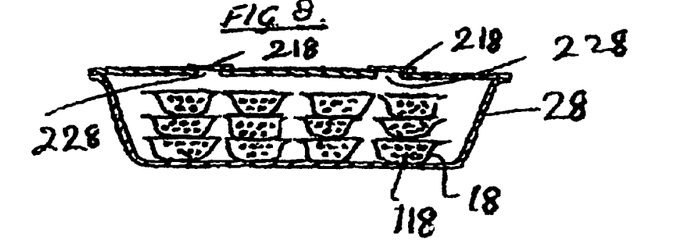

FIG. 8 shows an outer container 28 having two holes 228 in its lid, each covered by a selective ACM 218. Within the container 28 are a plurality of inner containers 18, each having a plurality of pinholes 118, e.g. eight pinholes each 100 mu. in diameter. Within the inner containers 18 is a respiring biological material (not shown), e.g. green beans.

The invention is illustrated in the following examples.

Example 1

A box-shaped module 55×38×2 in. (1.4×0.95×0.05 m) was constructed from ¼ in. (6.3 mm) thick acrylic sheet. The middle of each of the larger surfaces was cut out, leaving a window 53×36 in. (1.3×0.9 m). Each of the windows was covered by an ACM composed of microporous film (Teslin) having a coating thereon of a cross-linked poly(dimethyl vinyl siloxane). The ACM had an OTR of about 1,160,000 cc/100 in.$^2$-day-24 hr and an R ratio of about 3.5. The coated faces of the ACMs were on the outside of the module and had a total area of about 3816 in.$^2$ (2.5 m$^2$). Holes about 1.5 in. (38 mm) in diameter were cut close to diagonally opposite corners of the solid 55×2 in. (1.4×0.05 m) faces of the module, and flexible pipes attached thereto.

The module was placed in the middle of a room, with the flexible pipes extending out of the room. 126 boxes, each box containing about 40 lbs. of ripening bananas, were placed in the room, and the room was sealed. One of the pipes was connected to an air supply, and the other pipe was vented to the atmosphere, so that fresh air could be supplied to the module, and $CO_2$-enriched air removed from it. For an initial period, no air was supplied to the module. At the end of this initial period, the atmosphere around bananas contained about 12.8% $O_2$ and about 7.5% $CO_2$. The air supply was then switched on. After an equilibration period, the atmosphere around bananas contained about 16.5% $O_2$ and about 1.7% $CO_2$.

Example 2

This Example made use of a shipping container about 37.75 ft. long, 7.5 ft. wide and 8.3 ft. high (11.5 m long, 2.3 m wide and 2.5 m high). A module substantially as described in Example 1 was placed near, and parallel to, the closed end of the container, with the flexible pipes leading out of the container. The container was fitted with $O_2$ and $CO_2$ sensors, and was maintained at about 34° F. (1° C.) throughout the experiment. Freshly harvested broccoli crowns, 15,480 lbs. (7021 kg), cooled to about 34° F. (1° C.), were placed in the container. The initial packaging atmosphere was air.

For about the first 46 hours, no air was passed through the module. At about hour 46, the container was gassed with a mixture of nitrogen and $CO_2$. For about the next 24 hours, air was passed through the module at about 150 ft.$^3$/hr (4.25 m$^3$/hr). For about the next 24 hours air was passed through the module at about 25 ft.$^3$/hr (0.7 m$^3$/hr). For about the next 24 hours no air was passed through the module. For about the final 48 hours, air was passed through the module at about 50 ft.$^3$/hr (1.4 m$^3$/hr). The Table below shows the approximate $O_2$ and $CO_2$ contents at various times, and FIG. 6 shows the $O_2$ and $CO_2$ contents throughout the experiment.

| | Time (hr. min) | | | | | | |
|---|---|---|---|---|---|---|---|
| | 0 | 41.1 (a) | 46.1 (b) | 72.17 | 96.17 | 116 | 164 |
| % $O_2$ | 21 | 13 | 4.3 | 7.5 | 8 | 6.5 | 9 |
| % $CO_2$ | 0 | 6 | 8.7 | 6.5 | 7 | 8 | 7 |

(a) before gassing
(b) after gassing

Example 3

Three identical strawberry-containing packages were prepared and tested as follows. Strawberries (3 lb, 1.35 kg) were sealed inside a polyester clamshell tray. In the top of the tray there was a hole 1.875 in. (47 mm) in diameter over which was sealed an ACM composed of microporous film and having a coating thereon of an SCC/polysiloxane block copolymer as described in U.S. Pat. No. 6,548,132. There was a 26 gauge pinhole in the ACM, to equalize pressure. The sealed tray was placed inside a polyethylene bag which had 5 pinholes, each 26 gauge, in it, and the polyethylene bag was then sealed. The resulting assembly was maintained at 36° F. (2° C.) for 112 days, at which time the polyethylene bag was opened and the tray taken out. The tray was then maintained at 68° F. (20° C.) for 2 more days.

Example 4

Comparative

Example 3 was repeated except that the outer bag was not used.

Example 5

Comparative

Example 3 was repeated, except that there was no ACM over the hole in the tray containing the strawberries.

The table below shows the average oxygen and carbon dioxide contents of packaging atmosphere around strawberries at various times, the contents at Day 12 being taken just before the outer polyethylene bag was opened.

| | | Day 3 | Day 5 | Day 12 | Day 14 |
|---|---|---|---|---|---|
| Example 3 | % $O_2$ | 9.3 | 9.3 | 7.5 | 8.0 |
| | % $CO_2$ | 7.2 | 7.6 | 7.5 | 5.7 |
| Example 4 | % $O_2$ | 14.9 | 14.9 | 14.1 | 5.8 |
| | % $CO_2$ | 1.7 | 1.7 | 14.0 | 5.5 |
| Example 5 | % $O_2$ | 14.5 | 9.3 | 7.5 | 8.0 |
| | % $CO_2$ | 6.1 | 7.6 | 7.5 | 5.7 |

What is claimed is:

1. A method of loading a container, said container being a shipping container which has a capacity of at least 40 m$^3$, and which can be loaded onto and transported by a ship or a truck, the method comprising
   (A) providing said shipping container,
   (B) loading a respiring biological material into the container;
   (C) after step (B), placing in the container a module which
      (a) was constructed separately from the container, and
      (b) comprises (i) a closed chamber comprising an internal atmosphere control member (ACM), (ii) and inlet and (iii) an outlet, the ACM having a surface area greater than 0.65 m$^2$ and comprising a first surface and a second surface, the first surface being in direct contact with a first atmosphere surrounding the respiring biological material, and the second surface not being in direct contact with the first atmosphere, not being part of the exterior surface of the container, and being in direct contact with a second atmosphere within the closed chamber;
   (D) connecting the inlet of the module to a first conduit which is connected to one more sources of the second atmosphere;
   (E) connecting the outlet of the module to a second conduit which provides a gas disposal means; and
   (F) sealing the container.

2. A method according to claim 1 wherein each of the first and second conduits is flexible.

3. A method according to claim 1 wherein the ACM has an R ratio of least 3.0.

4. A method according to claim 1 wherein the ACM (i) comprises a microporous film having a coating of a side chain crystalline polymer thereon and (ii) has an oxygen $P_{10}$ ratio, over at least one 10° C. range between −5 and 15° C., of at least 1.3.

5. A method according to claim 1 wherein the module comprises a first internal ACM and an additional internal ACM, the first ACM being a selective ACM which (i) has an R ratio of at least 3.0, and (ii) consists of a polymeric coating on a porous substrate, the porous substrate being a microporous film or a nonwoven fabric, and the additional ACM having an R ratio of 1.0 to 2.3.

6. A method of loading a container, said container being a shipping container which has a capacity of at least 40 m³, and which can be loaded onto and transported by a ship or a truck, the method comprising
 (A) providing said shipping container,
 (B) loading a respiring biological material into the container;
 (C) after step (B), placing in the container a module which
  (a) was constructed separately from the container, and
  (b) comprises (i) a closed chamber comprising an internal atmosphere control member (ACM), (ii) and inlet and (iii) an outlet, the ACM having a surface area greater than 0.65 m² and comprising a first surface and a second surface, the first surface being in direct contact with a first atmosphere surrounding the respiring biological material, and the second surface not being in direct contact with the first atmosphere, not being part of the exterior surface of the container, and being in direct contact with a second atmosphere within the closed chamber;
 (D) connecting the inlet of the module to a first conduit which is connected to one more sources of the second atmosphere;
 (E) connecting the outlet of the module to a second conduit which provides a gas disposal means; and
 (F) sealing the container;
the method including the step of providing within the container an auxiliary closed chamber which is different from the closed chamber of the module, and which comprises an auxiliary internal atmosphere control member (ACM) having an R ratio of 1.0 to 2.3, and comprising a first surface and a second surface, the first surface being in direct contact with the first atmosphere, and the second surface not being in direct contact with the first atmosphere, not being part of the exterior surface of the container, and being in direct contact with an auxiliary second atmosphere, and access of gas to the auxiliary chamber and to the closed chamber in the module being controlled in different ways.

7. A method according to claim 6 wherein the auxiliary ACM has an R ratio of 1.

8. A method according to claim 6 wherein the auxiliary ACM comprises a porous sheet material which does not have a polymer coating thereon, the porous sheet material being a nonwoven fabric or a microporous film.

9. A method according to claim 6 wherein the respiring biological material is packed in a plurality of ACM-containing sealed inner containers.

10. A method according to claim 1 which includes the steps of providing one or more sensors which measure the concentration of at least one gas in the atmosphere surrounding the biological material, and providing pressure-generating means for supplying the second atmosphere to the second surface of the ACM at a rate which can be changed in response to input from the one or more sensors.

11. A method of unloading a container system which comprises:
 (a) a shipping container which
  (i) can be loaded onto and transported by a ship or a truck,
  (ii) has a capacity of at least 40 m³, and
  (iii) has an exterior surface;
 (b) a respiring biological material which
  (i) is sealed within the shipping container, and
  (ii) is surrounded by an inner atmosphere; and
 (c) a module which
  (i) was constructed separately from the shipping container,
  (ii) is within the container, and
  (iii) comprises a closed chamber including an internal atmosphere control member (ACM), an inlet for gas and an outlet for gas, the ACM having a surface area greater than 0.65 m² and comprising a first surface and a second surface, the first surface being in direct contact with the inner atmosphere, and the second surface not being in direct contact with the inner atmosphere, not being part of the exterior surface of the container, and being direct contact with a second atmosphere;
the method comprising the steps of
 (A) unsealing the container,
 (B) after step (A), removing the module, and
 (C) after step (B), unloading the respiring biological material from the container.

12. A method according to claim 11 wherein the module comprises a first flexible conduit which connects the inlet of the module to one or more sources of the second atmosphere, and a second flexible conduit which connects the outlet of the module to a gas disposal means.

13. A method according to claim 11 wherein the ACM has an R ratio of least 3.0.

14. A method according to claim 11 wherein the ACM (i) comprises a microporous film having a coating of a side chain crystalline polymer thereon and (ii) has an oxygen $P_{10}$ ratio, over at least one 10° C. range between −5 and 15° C., of at least 1.3.

15. A method according to claim 11 wherein the module comprises first and second internal ACMs, the first ACM being a selective ACM which (i) has an R ratio of at least 3.0, and (ii) consists of a polymeric coating on a porous substrate, the porous substrate being a microporous film or a nonwoven fabric, and the second ACM having an R ratio of 1.0 to 2.3.

16. A method according to claim 11 wherein the sealed container includes an auxiliary closed chamber which is different from the closed chamber of the module and which comprises an auxiliary internal atmosphere control member (ACM) having an R ratio of 1.0 to 2.3, the auxiliary ACM comprising a first surface and a second surface, the first surface being in direct contact with the first atmosphere, and the second surface not being in direct contact with the first atmosphere, not being part of the exterior surface of the container, and being in direct contact with an auxiliary second atmosphere, and access of gas to the auxiliary chamber and to the closed chamber in the module being controlled in different ways.

17. A method according to claim 16 wherein the auxiliary ACM has an R ratio of 1.

18. A method according to claim 16 wherein the auxiliary ACM comprises a porous sheet material which does not have a polymer coating thereon, the porous sheet material being a nonwoven fabric or a microporous film.

\* \* \* \* \*